United States Patent
Studnicka et al.

(10) Patent No.: US 12,018,961 B2
(45) Date of Patent: Jun. 25, 2024

(54) SIGNALING DEVICE

(71) Applicant: Siemens Aktiengesellschaft, Munich (DE)

(72) Inventors: Michal Studnicka, Trutnov (CZ); Petr Safranek, Náchod (CZ)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 235 days.

(21) Appl. No.: 17/630,575

(22) PCT Filed: Jul. 16, 2020

(86) PCT No.: PCT/EP2020/070158
§ 371 (c)(1),
(2) Date: Jan. 27, 2022

(87) PCT Pub. No.: WO2021/018618
PCT Pub. Date: Feb. 4, 2021

(65) Prior Publication Data
US 2022/0260390 A1    Aug. 18, 2022

(30) Foreign Application Priority Data
Jul. 31, 2019   (EP) .................................. 19189377

(51) Int. Cl.
*G01D 3/024*   (2006.01)
*G01D 3/10*    (2006.01)
*G01D 5/165*   (2006.01)

(52) U.S. Cl.
CPC ............... *G01D 3/024* (2013.01); *G01D 3/10* (2013.01); *G01D 5/165* (2013.01)

(58) Field of Classification Search
CPC .......... G01D 3/024; G01D 3/10; G01D 5/165
See application file for complete search history.

(56) References Cited

U.S. PATENT DOCUMENTS

| 5,619,129 A | * | 4/1997 | Kamiya | ................... | G01R 1/36 D10/78 |
| 6,028,995 A |  | 2/2000 | Jetton et al. | | |

(Continued)

FOREIGN PATENT DOCUMENTS

| CH | 253812 A | 9/1946 |
| CH | 253812   | 3/1948 |

(Continued)

OTHER PUBLICATIONS

International Search Report dated Nov. 11, 2020 based on PCT/EP2020/070158 filed Jul. 16, 2020.

(Continued)

*Primary Examiner* — Franklin D Balseca
(74) *Attorney, Agent, or Firm* — Cozen O'Connor

(57) ABSTRACT

A signaling device which generates a selection signal via an analog selection device for choosing a signal range, and a range scale for displaying the signal range chosen by the analog selection device, wherein the range scale includes setting ranges and a transition range, where one setting range of the setting ranges is arranged in an alternating manner with the transition range along the range scale, and the analog selection device is arranged such that selection of a setting range or a transition range along the range scale is selected and the analog selection device defines an analog selection value, and the signaling device additionally detects the analog selection value aided by the selection signal and checks whether this value corresponds to a value allocated to a transition range, and if so, outputs a signal via a signaler.

7 Claims, 1 Drawing Sheet

(56) References Cited

U.S. PATENT DOCUMENTS

| | | | |
|---|---|---|---|
| 6,218,824 B1 * | 4/2001 | Oldstead | G01R 15/125 |
| | | | 324/114 |
| 6,798,341 B1 * | 9/2004 | Eckel | G01K 1/045 |
| | | | 340/517 |
| 2005/0035895 A1 | 2/2005 | Byrne et al. | |
| 2006/0188043 A1 | 8/2006 | Zerbe et al. | |
| 2007/0195809 A1 | 8/2007 | Blanz et al. | |
| 2009/0092214 A1 | 4/2009 | Bommareddy et al. | |
| 2010/0327850 A1 | 12/2010 | Hoover et al. | |
| 2011/0092167 A1 | 4/2011 | Döttling et al. | |
| 2016/0187394 A1 | 6/2016 | Bergmann | |
| 2019/0195915 A1 | 6/2019 | Günther | |

FOREIGN PATENT DOCUMENTS

| | | |
|---|---|---|
| CN | 1678913 | 10/2005 |
| CN | 1855212 | 11/2006 |
| CN | 1886897 | 12/2006 |
| CN | 1934558 | 3/2007 |
| CN | 101390322 | 3/2009 |
| CN | 101821948 | 9/2010 |
| CN | 102067657 | 5/2011 |
| CN | 104181836 | 12/2014 |
| CN | 104330640 | 2/2015 |
| CN | 204990035 U | 1/2016 |
| CN | 105378435 | 3/2016 |
| CN | 107526442 | 12/2017 |
| CN | 107919930 | 4/2018 |
| CN | 108254091 | 7/2018 |
| CN | 108603614 | 9/2018 |
| CN | 109189662 | 1/2019 |
| CN | 109959811 | 7/2019 |
| DE | 1226205 | 10/1966 |
| DE | 2103109 | 4/1972 |
| DE | 2458319 | 6/1976 |
| DE | 102006026379 | 12/2007 |
| GB | 644068 | 10/1950 |
| KR | 19980065497 | 10/1998 |
| WO | WO 2005/091156 A2 | 9/2005 |

OTHER PUBLICATIONS

EP Search Report dated Feb. 14, 2020 based on EP19189377 filed Jul. 31, 2019.

Yang Xiaohui et al. "Application of Programmable Analog Device in Small Signals Measuring System", pp. 127-129, Jul. 1, 2007.

* cited by examiner

SIGNALING DEVICE

CROSS-REFERENCE TO RELATED APPLICATIONS

This is a U.S. national stage of application No. PCT/EP2020/070158 filed 16 Jul. 2020. Priority is claimed on European Application No. 19189377.5 filed 31 Jul. 2019, the content of which is incorporated herein by reference in its entirety.

BACKGROUND OF THE INVENTION

1. Field of the Invention

The invention relates to a signaling device which is configured to generate a selection signal via an analog selection device for choosing a signal range, and relates to a range scale for indicating the signal range chosen by the analog selection device.

2. Description of the Related Art

Signaling devices in the industrial environment frequently need to satisfy particular requirements as regards their incorporation in systems, such as a preferred form factor, a special type of mounting or a particular manner of operation of a sensor.

For instance, there may be provision that a signaling device in the form of a measuring device is to be integrated into a housing for mounting in an installation cabinet via a top-hat-rail fastening or mounting-rail fastening (as in accordance with DIN EN 60715:2001-0 or TH 35 according to DIN EN 50022), in which case the housing is to be made as narrow as possible. This may have the result that only very little space is available for operating elements or setting elements of the measuring device on the front of the top-hat-rail housing, and the operating elements or setting elements have to be made very small.

Furthermore, it may be desirable that operation of the operating elements or setting elements is to be effected via a screwdriver, as is frequently provided for in the electrical installation. Such an operating element, for instance, for a measuring-range setting, may in this case result in an incorrect configuration of the measuring device or in a misinterpretation of measured values, which can be ascribed to mechanical tolerances between the analog setting element and an assigned measuring-range display and/or scale. As a result, the reliability of measured values that are captured by a measuring device of such a type may be adversely impaired.

SUMMARY OF THE INVENTION

It is an object of the invention to improve the signaling device of the aforementioned type to the effect that the reliability of setting values is improved, particularly in the case of setting ranges adjoining one another on a scale.

This and other objects and advantages are achieved in accordance with the invention by a signaling device in which the range scale exhibits at least two setting ranges and at least one transition range, where a setting range of the at least two setting ranges is arranged in each instance in an alternating manner with, in each instance, a transition range of the at least one transition range along an extent of the range scale, and in which the analog selection device is arranged such that a selection of a setting range or of a transition range occurs along the extent of the range scale and in the process the analog selection device establishes an analog selection value, and in which the signaling device is further configured to capture the analog selection value with the aid of the selection signal and to check whether this value corresponds to a value that has been assigned to a transition range, and, if appropriate, to output a signal via a signaler included by the signaling device.

As a result, it is possible to ensure that, at a transition between two adjacent setting ranges, the device outputs a signal that indicates to a user that a transition range has been chosen, in the case of which it cannot be unambiguously discerned on the scale which of the two adjacent setting ranges has actually been selected, and the analog selection device therefore finds itself in a transition range of the scale. The analog selection value, however, is nevertheless always unambiguous and independent of the scale. As a result, it becomes possible to ensure that a further actuation of the analog selection device by the user is needed in order to obtain a correct selection of the desired setting range and, as a result, the reliability, for instance, of ascertained measured values is improved by virtue of an unambiguous, correct measuring-range selection.

The device in accordance with the invention can be employed, for instance, as a measuring device or for setting manipulated variables that are arranged alongside one another on a scale and are separated from one another by transition ranges.

There may also be provision that the range scale comprises a visible first scale and a logical, non-visible second scale.

The visible scale has, for instance, been imprinted onto the measuring instrument, whereas the logical scale has been configured or programmed by the logic circuit.

The visible scale may correspond to the logical scale, or it may also deviate from the logical scale.

For instance, the visible scale may dispense with explicitly discernible transition ranges, or may show these only very narrowly, even though the logical scale provides for other or wider transition ranges. The deviation between the logical scale and visible transition ranges of the imprinted scale may be useful, in order to take the mechanical tolerances of the scale and of the analog selection device into consideration appropriately.

The setting ranges of the visible scale and the setting ranges of the logical scale correspond to one another and at least overlap. In other words, a respective setting range of the visible scale may be larger than the corresponding setting range of the logical scale, because a transition range of the logical scale takes up a part of the respective setting range of the visible scale.

The transition ranges of the logical scale may overlap with setting ranges of the visible scale.

The transition range of the logical scale can be configured or programmed by the logic circuit.

By virtue of the signaler, a departure from a chosen range, for instance, a measuring range, and a subsequent entry into an adjacent new measuring range is ensured by appropriate signaling. In other words, by virtue of a sequence consisting of a first selected range, an adjoining transition range and an adjoining second selected range it is ensured, and signaled to an operator, that a change of range has occurred. Consequently, the operator is not required to merely rely on the reading of the position of the analog selection device in relation to a scale that is error-prone by virtue of mechanical tolerances, but also finds out additional, reliable information relating to a change of range that has been carried out.

The signal is generated by the signaler, such as optically by an LED, acoustically by a loudspeaker or tone-generator, or even haptically by a vibrator.

In a further embodiment of the invention, the signaling device includes an electronic circuit. As a result, the device can be realized in a straightforward manner, such as without a microcontroller in which appropriate software would need to run.

In a further embodiment of the invention, the signaling device includes a measuring device, preferentially a temperature-monitoring relay. As a result, it becomes possible to ensure that several measuring ranges of temperature sensors can be selected by the measuring device by using a very inexpensive, small and easy-to-operate analog selection device.

In a further embodiment of the invention, the extent of the range scale is circular. In this case, the extent of the scale corresponds to an angular range. As a result, it becomes possible to ensure use can be made of a very inexpensive, small and easy-to-operate analog selection device which is particularly suitable for operation with a screwdriver.

In the case of a circular scale, it is favorable if there are at least as many transition ranges as there are setting ranges.

In a further embodiment of the invention, the analog selection device is a potentiometer. As a result, it becomes possible to ensure the analog selection device can be realized very inexpensively by a technology that is already tried and tested in the industrial environment and that permits not only a range selection but also, for instance, an analog setting of the selected range or of the measuring sensitivity.

In a further embodiment of the invention, at least one transition range of the at least one transition range has an extent along the extent of the measuring-range scale that is at most half as large as the extent of a setting range of the at least two setting ranges along the extent of the measuring-range scale. As a result, it becomes possible to ensure that a transition range on the scale has such favorable dimensions with respect to a setting range, and for the measuring device or the housing thereof overall a small physical size, i.e., a small form factor, is obtained.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be elucidated in more detail with reference to an embodiment represented in the enclosed drawings, in which.

DETAILED DESCRIPTION OF THE EXEMPLARY EMBODIMENTS

Figure 1:
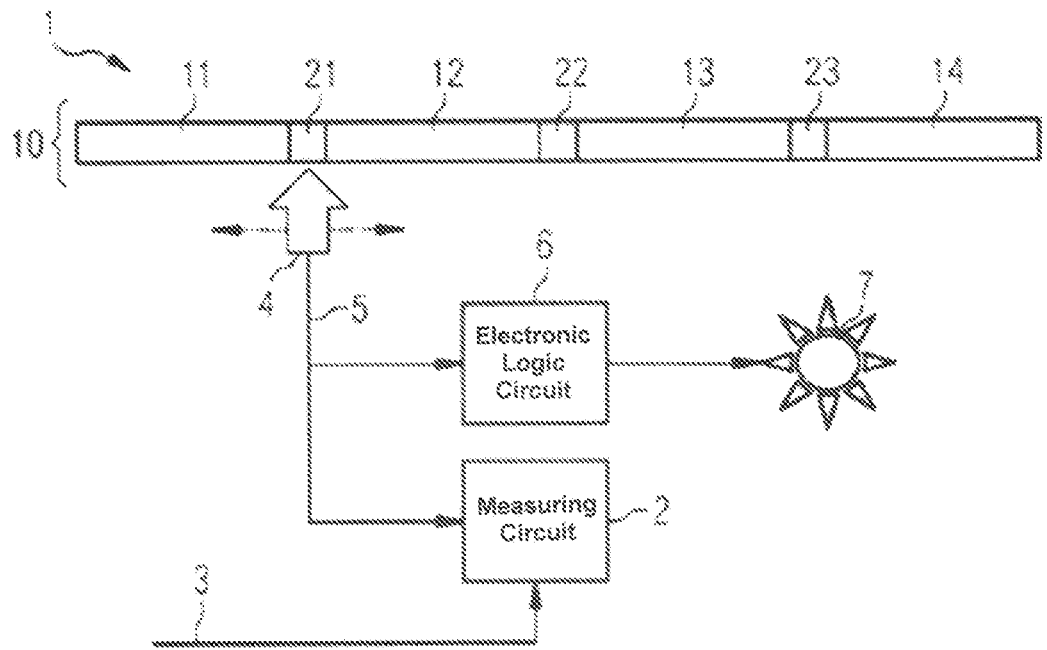
FIG. 1 shows a block diagram of signaling device in accordance with an embodiment of the invention.

FIG. 1 shows schematically a block diagram for an embodiment of a measuring device 1 in accordance with the invention, which in this example is a temperature-monitoring relay.

In this example, the device in accordance with the invention is accordingly a measuring device. Alternatively, the device could, for instance, also be employed for selecting a manipulated variable that, for instance, specifies a target variable for a control system.

The measuring device exhibits a measuring circuit 2 for capturing a measuring signal 3, an analog selection device 4 for choosing a measuring range when capturing the measuring signal 3, and a measuring-range scale 10 for indicating the measuring range chosen by the analog selection device 4.

The measuring-range scale 10 exhibits four setting ranges 11, 12, 13, 14 and three transition ranges 21, 22, 23.

A setting range of the four setting ranges 11, 12, 13, 14 is arranged in each instance in an alternating manner with, in each instance, a transition range of the three transition ranges 21, 22, 23 along an extent of the measuring-range scale 10.

In other words, setting ranges and transition ranges are, in each instance, arranged adjacently, adjoining one another along the extent of the circular measuring-range scale 10.

The analog selection device 4 is arranged such that a selection of a setting range 11, 12, 13, 14 or of a transition range 21, 22, 23 occurs along the extent of the measuring-range scale 10 and in the process the analog selection device 4 establishes an analog selection value 5. In this example, the analog selection device 4 is a rotary potentiometer with an adjustable ohmic resistance. Other analog selection devices, such as slide potentiometers or adjustable capacitors, are also possible.

Furthermore, an electronic logic circuit 6 and a signaler 7 are provided.

The electronic logic circuit 6 has been configured to capture the analog selection value 5 and to check whether this value corresponds to a value that has been assigned to a transition range 21, 22, 23. The logic circuit may have been built up in discrete manner, or even by a programmed implementation unit in a microcontroller. An analog-to-digital conversion for the analog selection value 5 may have been provided.

If the selection value 5 has been assigned to a transition range 21, 22, 23, an optical signal, for instance, is output via the signaler 7 in the form of an LED.

In addition, the LED may also be used for other display purposes. The current display can be distinguished from the signaling put into effect previously with the aid of, for instance, a different display color or a flashing frequency of the LED.

Figure 2:
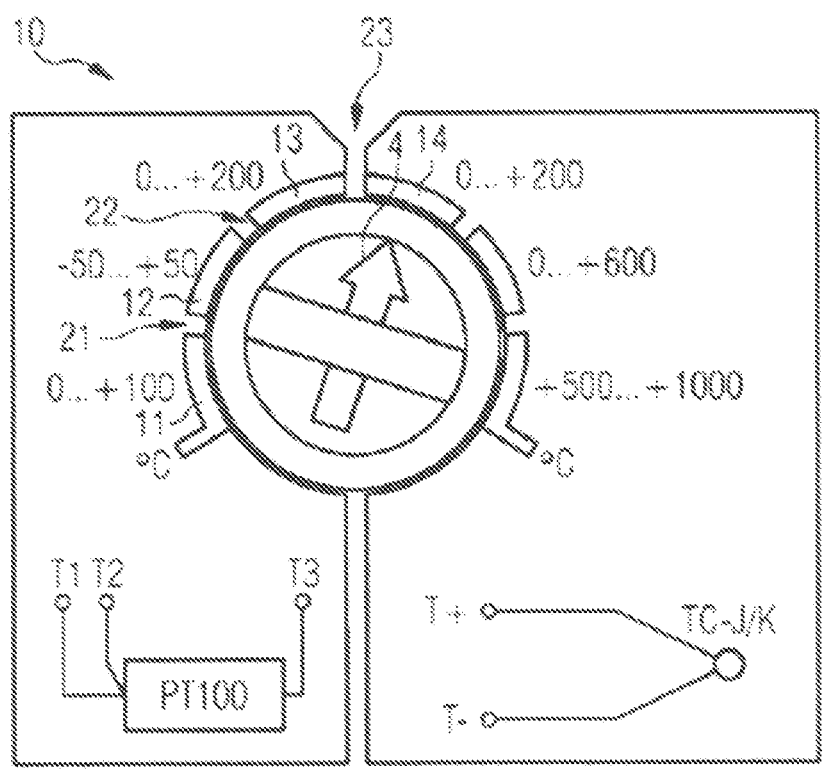
FIG. 2 shows an exemplary scale for measuring-range selection, and a corresponding analog selection device in accordance with the invention.

FIG. 2 shows an example of a scale 10 for the measuring device 1, where the analog selection device 4 can be operated via a screwdriver. An arrow as a marker has been affixed to the analog selection device 4, in order to make the position with respect to the scale 10 unambiguous and visible.

The scale 10 has been implemented such that at least one transition range of the three transition ranges 21, 22, 23 has an extent along the extent of the measuring-range scale 10 (here, an angular range of the circular scale) that is at most half as large as the extent of a setting range of the four setting ranges 11, 12, 13, 14 along the extent of the measuring-range scale 10.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A signaler which generates a selection signal via an analog selector for choosing a signal range, and a scale for indicating the signal range chosen by the analog selector;
   wherein the scale exhibits at least two setting ranges and at least one transition range, a setting range of the at least two setting ranges each being arranged in an alternating manner with, in each instance, a transition range of the at least one transition range along an extent of the scale;
   wherein the analog selector is arranged such that a selection of a setting range or a transition range occurs along the extent of the scale such that the analog selector establishes an analog selection value; and
   wherein the signaler captures the analog selection value aided by the selection signal and checks whether the captured analog selection value corresponds to a value which has been assigned to a transition range, and, if appropriate, outputs a signal by an included further signaler.

2. The signaler as claimed in the claim 1, wherein the signaler includes an electronic circuit.

3. The signaler as claimed in claim 1, wherein the signaler includes a measuring device.

4. The signaler as claimed in claim 3, wherein the measuring device comprises a temperature-monitoring relay.

5. The signaler as claimed in claim 1, wherein the extent of the range scale extends circularly.

6. The signaler as claimed in claim 1, wherein the analog selector is a potentiometer.

7. The signaler as claimed in claim 1, wherein at least one range of the at least one transition range extends in a direction along the scale which is at most half as large as a direction along which a setting range of the at least two setting ranges extends along the scale.

* * * * *